March 2, 1954     B. M. HYMAN     2,670,582

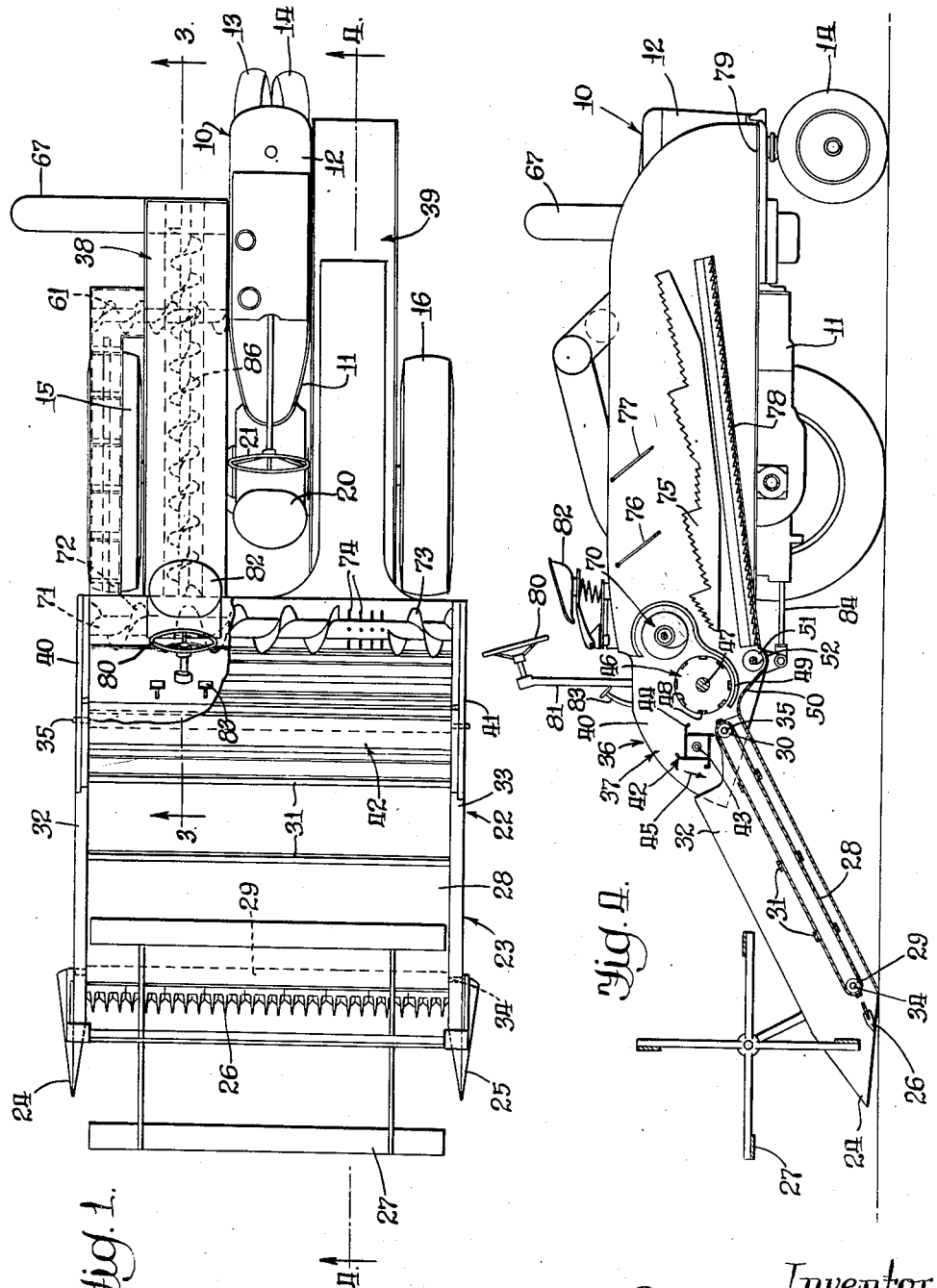

TRACTOR MOUNTED HARVESTER THRESHER

Filed Feb. 2, 1952     2 Sheets-Sheet 2

Inventor.
Benjamin M. Hyman
Atty.

Patented Mar. 2, 1954

2,670,582

UNITED STATES PATENT OFFICE 2,670,582

TRACTOR MOUNTED HARVESTER THRESHER

Benjamin M. Hyman, East Moline, Ill., assignor to International Harvester Company, a corporation of New Jersey Application February 2, 1952, Serial No. 269,631

20 Claims. (Cl. 56—21)

This invention relates to a new and improved tractor-mounted harvester-thresher.

A principal object of this invention is to provide means in a harvester-thresher for convenient mounting on an agricultural tractor wherein the machine is substantially uniformly balanced about the tractor.

An important object of this invention is the provision of means for mounting a harvester-thresher on an agricultural type tractor of the type having a relatively elongated engine and chassis and wherein portions of the threshing and separating units are divided and are disposed longitudinally of and adjacent each side of the elongated tractor engine and chassis.

Another important object of this invention is to supply a harvester-thresher having symmetrical parts of substantially uniform weight for mounting in a substantially symmetrical manner on an agricultural tractor.

Still another important object of this invention is to provide a tractor-mounted harvester-thresher incorporating a threshing cylinder equal in width to the harvester pickup and further having means for initially separating the straw from the grain and delivering the initially separated materials to a grain cleaning and further separating chamber along one side of the tractor engine and delivering the straw and trash material to a cleaning unit adjacent the other side of the tractor engine.

Another and still further important object of this invention is the provision of means in a tractor-mounted harvester-thresher for threshing throughout the full width of the harvester and having first auger conveying means located beneath the thresher for delivery to a grain cleaning chamber disposed longitudinally on one side of the tractor and a second auger conveyor means disposed slightly above and rearwardly of the thresher for delivering straw and other trash material laterally for delivery to a straw cleaning mechanism disposed longitudinally of and adjacent the other side of the tractor.

Another and still further important object of this invention is to equip harvester threshing means for mounting on a tricycle type agricultural tractor in which large traction wheels of the tractor are positioned at the forward end thereof as determined by the direction of travel of the machine and further in which portions of the harvester-thresher are carried in uniformity around the tractor.

Other and further important objects will become apparent from the disclosures in the following specification and accompanying drawings.

In the drawings:

Fig. 1 is a top plan view of the tractor-mounted harvester-thresher of this invention.

Fig. 4 is a sectional view taken on the line 4—4 of Fig. 1.

As shown in the drawings:

Figure 3:
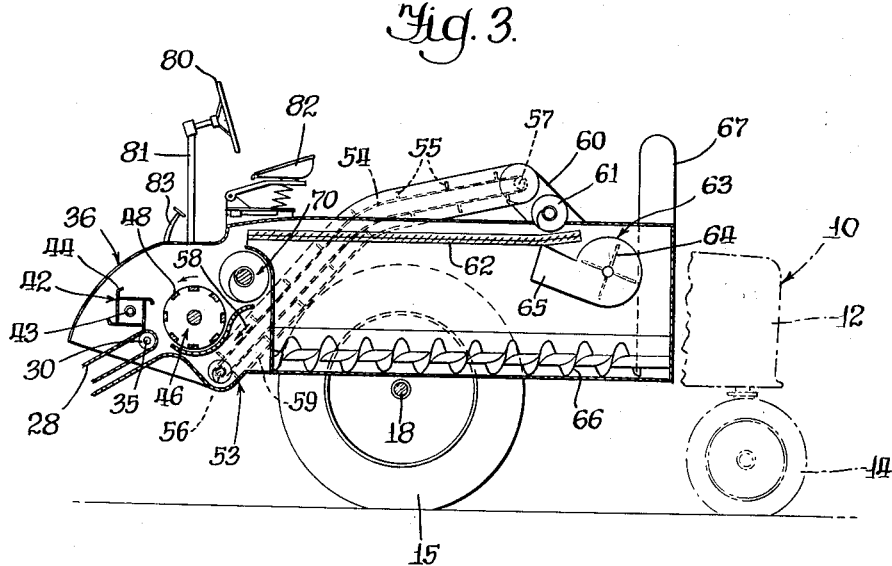
Fig. 3 is a fragmentary sectional view taken on the line 3—3 of Fig. 1 with part of the tractor shown in dotted lines.
Figure 2:
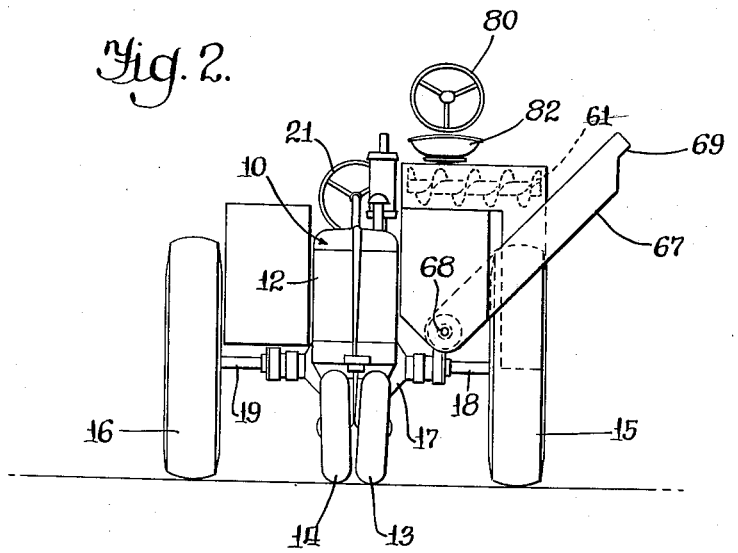
Fig. 2 is an end elevational view of the device of Fig. 1.

The reference numeral 10 indicates generally an agricultural tractor having an elongated longitudinally extending chassis 11 carrying an engine 12 similarly elongated and carried directly on and above the chassis 11. The tricycle type tractor is equipped with steerable wheels 13 and 14. These wheels are relatively closely coupled and in effect constitute a single wheel point of suspension. The other end of the chassis 11 is carried by relatively widely spaced large traction wheels 15 and 16. The chassis 11 is provided with a differential housing 17 at the end adjacent the large traction wheels. Shafts 18 and 19 extend laterally outwardly of the differential housing 17 and support the traction wheels 15 and 16 respectively. Ordinary usage of the tractor would be in a direction in which the steerable wheels 13 and 14 constitute the forward end of the vehicle. In operating the tractor in this normal forward direction, an operator's seat is provided at 20 in close proximity to a steering wheel 21 whereby the operator may effect rotation of the steerable wheels 13 and 14 and have suitable access to the control means, not shown, for the engine 12.

In the device of this invention the tractor is not operated in its normal direction but rather is operated in a direction in which the large traction wheels 15 and 16 comprise the forward end.

Numerous attempts have been made to mount a harvester-thresher on conventional types of farm tractors without commercial success. An ordinary harvester-thresher is quite heavy and when mounted with its customary construction onto a standard farm tractor creates an excessive burden on that tractor by reason of an uneven loading and further by reason of an extreme offset of one of the large traction wheels in order to have the harvester-thresher fit onto the tractor. It therefore appears essential to alter the ordinary harvester-thresher construction and provide a harvester-thresher having parts of relatively uniform weight and size whereby the relatively weighty and extensive cleaning members of the separator are divided for disposition adjacent both sides of the elongated tractor chassis and engine. It should be understood that the farm tractor need not be a tricycle type, but rather only that it have an elongated engine and chassis and the ground engaging traction means spaced laterally from each side thereof.

The combine or harvester-thresher designated by the numeral 22 is provided with a scoop-shovel type of platform 23 which extends forwardly in the direction of travel of the tractor 10 when it is carrying the combine 22 of this invention. The scoop-shovel platform includes laterally spaced crop divider members 24 and 25, a cutter bar 26 extending across the full width of the platform between the divider points 24 and 25, a grain feeding reel 27, and finally an upwardly and rearwardly extending slatted conveyor 28. The conveyor 28 as best shown in Fig. 4 is mounted on spaced end rollers 29 and 30 and the spaced slats are designated by the numeral 31. The scroop-shovel platform 23 is further equipped with laterally spaced upwardly extending side sheets 32 and 33. The canvas end rollers 29 and 30 are mounted in shafts 34 and 35 respectively which are journaled within the side sheets 32 and 33. The shaft 35 further constitutes the hinge axis about which the scoop-shovel platform 23 may have vertical swinging movement.

The threshing and separating mechanism is identified generally by the numeral 36. This portion of the harvester-thresher includes a transversely disposed front thresher part 37 and rearwardly extending elongated separator parts 38 and 39. The front part 37 is coextensive in width with the harvesting scoop-shovel platform 23. This front part includes spaced side sheet members 40 and 41. The shaft 35 of the harvesting platform 23 extends outwardly beyond the harvester side sheets 32 and 33 and is journaled within the spaced side sheets 40 and 41 of the front part 37 of the threshing mechanism 36. It will thus be apparent that the harvesting platform is hinged for vertical movement with respect to the threshing mechanism. A beater 42 is carried on a shaft 43 which is journaled for rotation within the spaced side members 40 and 41. The beater 42 has outwardly extending circumferentially spaced paddles 44 which terminate closely adjacent the upper edge of the conveyor 28 and are adapted to be rotated in the direction indicated by the arrow 45 for the purpose of delivering grain and straw from the upper flight of the conveyor 28 rearwardly into the area containing a threshing cylinder 46.

The threshing cylinder 46 extends over the full width of the front part 37 of the threshing machine and thus is equal in width to the cutter bar 26 of the harvesting platform. The cylinder 46 is mounted on a shaft 47 which is journaled for rotation within the spaced side members 40 and 41. The cylinder includes rub bars or the like 48 around the circumference thereof for effecting the removal of the grain from the straw and hull within which the grain is contained. The rub bars 48 cooperate with a concave 49 fixedly mounted within the front thresher part 37 and extending between the side members 40 and 41. The concave 49 is a grate-like member which cooperates with the rub bars 48 of the cylinder to effect the threshing of the grain. The grain that is threshed drops down through the concave 49 onto a hopper 50 of the thresher part 37. An auger conveyor 51 is transversely disposed within a trough-like bottom 52 of the hopper 50 and is adapted to convey the grain fed thereto laterally to one side as best shown in Fig. 3 where the grain is delivered to the upwardly and rearwardly extending elevator 53.

The elevator 53 includes a chain-type conveyor 54 having intermittently spaced lugs 55. The chain conveyor 54 is carried on end sprockets 56 and 57 journaled within the elevator housing 53. The conveyor is adapted to travel in the direction indicated by the arrow 58 so that the lugs or paddles 55 contact the lower surface 59 of the elevator to thus convey the grain and any trash therewith upwardly and rearwardly to discharge into a hopper or the like 60. An auger or screw conveyor 61 is journally carried within the hopper 60 and is disposed over the part 38 of the threshing and separating mechanism 36. The disposition of the auger 61 is best shown in Fig. 1 and it will be apparent that the grain by reason of the auger will be distributed over the full width of the elongated cleaning and separating part 38.

The part 38 is disposed, as previously stated, on one side of the tractor chassis and engine and includes a grain shaking pan 62. The grain shaking pan 62 is reciprocated back and forth by means, not shown, for further effecting the separation of trash from grain. A fan 63 is equipped with a bladed rotor 64 and a discharge spout 65 projecting forwardly and slightly upwardly beneath the grain pan 62. The fan is arranged to deliver a blast of air upwardly and through the grain pan 62 with a sufficient degree of force to remove any light trash material outwardly of the top of the separator top 38 and permit the heavier grain to fall downwardly into the bottom of the part 38. An auger conveyor 66 is longitudinally disposed within the bottom of the part 38 and carries the cleaned grain rearwardly of the part 38. A wagon elevator 67 is hingedly mounted about the shaft 68 of the auger 66 and is arranged and constructed to receive cleaned grain from the auger 66 to deliver it upwardly to a discharge spout 69 of the elevator 67. The cleaned grain may then be discharged into a receptacle or trailing wagon or the like, none of which has been shown.

The part 39 of the separator lies parallel to the part 38 on the other side of the tractor chassis and engine and is adapted to receive the straw, trash material and any grain that might not be removed by the cooperation of the threshing cylinder 46 with the concave 49. The parts 38 and 39 are uniformly balanced on the tractor in a substantially symmetrical manner both as to weight and spacing. All the straw and trash material is delivered upwardly and rearwardly from the cylinder 46 into the scope of a transversely disposed conveyor mechanism 70. The conveyor 70 includes a transversely positioned shaft 71 journaled for rotation within the side members 40 and 41 of the front part 37 of the thresher. Auger screw means 72 is provided on the shaft 71 over a substantial portion of the length of the shaft 71 and is adapted to deliver the straw and other material laterally toward the side of the tractor having the separator part 39. Similarly an opposing auger screw flight 73 is provided on the other end of the shaft 71 and opposes the flight 72 so that it also feeds material but over a shorter length to a position directly in front of the separator part 39. A plurality of radial fingers 74 are carried by the shaft 71 at the position forwardly of the part 39. The fingers 74 are arranged and constructed to deliver straw and all other material from the screw conveyors 72 and 73 rearwardly in a longitudinal direction into the separator part 39. This is best shown in Fig. 4 wherein a plurality of straw racks 75 within the part 39 are adapted to receive the incoming material. Retarding curtains 76 and 77 are hung within the part 39 above the straw racks 75 and in the path of the incoming straw material. The retarding curtains insure that the straw material will not be propelled entirely through the separator 39 without being treated by the separating means therein. The curtains cause the straw to fall downwardly onto the straw racks whereupon any grain remaining in the straw is jarred loose from the straw and husks and drops therethrough onto a grain pan 78 which is inclined upwardly and rearwardly and adapted to permit the grain to fall by gravity forwardly and downwardly for discharge into the screw conveyor 51 which as previously described carries the grain to the grain cleaning part 38 for delivery to a receptacle such as a trailing wagon. The straw and other trash material with the grain removed are discharged at the rearward end of the part 39 downwardly out a discharge 79.

In order that the tractor may be driven in a direction opposite to the normal forward travel, a steering wheel 80 is mounted on a post 81 which in turn is carried by and over the front part 37 of the thresher 36. The steering wheel 80 is arranged and constructed to rotate the steerable wheels 13 and 14 in the same manner as the steering wheel 21. An operator's seat 82 is positioned on top of the part 38 directly behind the steering wheel 80. It is apparent that in this position the operator has complete visibility of the crops he is harvesting and also has knowledge as to whether or not the machine is functioning properly. The engine controls are signified by the numeral 83 in close proximity to the steering wheel post 81. A power takeoff shaft 84 extends rearwardly from the chassis 11 of the tractor and supplies rotational drive for the various elements of the harvester-thresher. The detailed drive means from the power takeoff shaft 84 to the various elements has not been shown as it is not believed to be a part of the present invention.

In operation, an operator in position on the seat 82 drives the tractor 10 in the direction of the large traction wheels 15 and 16. The machine with the harvester-thresher 22 mounted thereon is propelled through a field of standing grain. The reel 27 feeds the upper ends of the standing grain stalks rearwardly whereafter the butt ends of the stalks are cut by the cutter bar 26. The grain and straw thus cut are moved upwardly and rearwardly by reason of the cross slats 31 on the conveyor 28. The grain dividers 24 and 25 in addition to insuring separation of the grain act also as ground runners for the hinged scoop-shovel harvesting platform 23. As the grain and straw reach the upper end of the conveyor 31, they are removed by the paddle feed wheel 42 and delivered to the threshing cylinder 46. At this point the grain is removed from the straw and hull within which it is positioned. The threshing cylinder as previously stated extends across the full width of the machine so that the grain will be more uniformly threshed as it passes therethrough. It is, of course, to be understood that the threshing cylinder 46, in cooperation with its concave 49, is not capable of effecting a complete removal of and/or a complete cleaning of the grain with this single pass of the material. The threshed grain drops through the concave 49 into the screw conveyor 51 where it is fed laterally to the elevator 53 for deposit across the top of the grain cleaning chamber 38. The auger 61 spreads the grain and any trash material uniformly over the width of the grain pan 62. The heavy grain falls through the pan into the rearwardly running auger conveyor 66 during which time the cleaning fan 63 causes the discharge of the trash and dirt up and out from the grain pan 62. The clean grain is thereafter carried upwardly and laterally by the elevator 67 to the discharge spout 69.

The straw and any grain that has not been threshed are delivered upwardly and rearwardly from the threshing cylinder 46 into the opposing augers 72 and 73 whereupon the material is moved to a position centrally in front of the straw cleaning chamber 39. The plurality of radial fingers 74 or any other suitable means on the auger shaft 71 cause the delivery of the material fed laterally by the opposing augers 72 and 73 into the straw separator 39. The straw is then propelled against the retarding curtains 76 and 77 whereupon it drops onto the straw cleaning racks 75 which have a reciprocatory motion by means, not shown, for shaking loose any grain that might still be with the straw. The straw continues its rearward movement over the straw cleaning racks 75 to a discharge at 79 and any grain or the like falls through the straw racks onto the inclined grain pan 78 which delivers the grain forwardly and downwardly into the auger 51 where it joins the grain which is initially delivered thereto directly through the concave 49.

It is believed that herein is provided a novel tractor-mounted harvester-thresher in which the several units thereof are uniformly balanced around the entire tractor for better weight distribution and also in a manner utilizing the space on a relatively standard farm tractor more economically and thus eliminating the overloading and crowding of the tractor carrying the relatively large harvester-thresher.

Numerous details of construction may be varied throughout a wide range without departing from the principles disclosed herein and I therefore do not propose limiting the patent granted hereon otherwise than as necessitated by the appended claims.

What is claimed is:

1. A tractor-mounted harvester-thresher comprising a threshing part mounted on and extending across one end of a tractor, a scoop-type harvester platform hinged to said thresher part and extending in a direction away from said tractor, means for elevating grain to be threshed on said scoop platform, a threshing cylinder journally mounted transversely in said thresher part, said threshing cylinder being substantially equal in width to said scoop type harvester platform, a concave mounted in said thresher part for cooperation with said threshing cylinder, and separator means carried on said tractor.

2. A device as set forth in claim 1 in which the tractor includes an elongated centrally disposed chassis and engine, and wherein the separator means has a first portion thereof lying parallel to and adjacent the elongated chassis and engine of the tractor.

3. A device as set forth in claim 2 in which a second portion of said separator means lies parallel to and adjacent the other side of the elongated chassis and engine and wherein the spaced first and second portions of the separator means are symmetrically carried on the tractor both as to weight and size.

4. A device as set forth in claim 3 in which the first portion of the separator means is essentially for threshed grain and the second portion of the separator means is essentially for straw, and means for generally separating the threshed grain and straw after action by the full width threshing cylinder for delivery of the threshed grain to the first portion of the separator means and for delivery of the threshed straw to the second portion of the separator means.

5. A device as set forth in claim 4 in which the means for generally separating the threshed grain and straw includes an auger screw conveyor substantially beneath the threshing cylinder for delivery of the threshed grain laterally to one side of said tractor to the first portion of the separator means, and auger conveyor means substantially above and to the rear of said threshing cylinder for delivery of the threshed straw laterally to the other side of said tractor to the second portion of the separator means.

6. A device as set forth in claim 5 in which the auger conveyor means above and to the rear of the threshing cylinder includes a straight through shaft, opposing augers on said shaft on each side of said second portion of the separator means, and means on said shaft directly adjacent said straw separator means for effecting transfer of material from the opposing augers to said second portion of the separator means.

7. A device as set forth in claim 5 in which an elevator is provided adjacent the end of the auger screw conveyor for delivery of the threshed grain to the top of the first portion of the separator means.

8. A device as set forth in claim 7 in which auger means is provided across the top of the first portion of the separator means adjacent the discharge of the elevator whereby the auger means spreads the threshed grain across the full width thereof.

9. A device as set forth in claim 8 in which fan means is provided in said first portion of the separator means for cleaning the threshed grain.

10. A device as set forth in claim 9 in which conveyor means is disposed in the bottom of said first portion of the separator means for conveying the grain to one end thereof.

11. A device as set forth in claim 6 in which the second portion of the separator means includes straw cleaners, a grain saving means, and said grain saving means communicating with said auger screw conveyor beneath the threshing cylinder.

12. A harvester-thresher for mounting on a tricycle type farm tractor having a longitudinally extending central chassis in which a pair of spaced apart large traction wheels are at the forward end as determined by the direction of travel and a steerable wheel is at the rear thereof, comprising a threshing unit mounted on and extending across the front of said tractor, and a harvesting unit mounted on and projecting forwardly from said threshing unit, said harvesting unit being substantially equal in width to the threshing unit and positioned across the front thereof.

13. A device as set forth in claim 12 in which a separator unit is located adjacent one side of said tractor chassis.

14. A device as set forth in claim 13 in which tractor control means are positioned atop the threshing unit and an operator's seat is positioned atop the separator unit.

15. A device as set forth in claim 13 in which a second separator unit is located adjacent the other side of said tractor chassis.

16. A device as set forth in claim 14 in which a second separator unit is located adjacent the other side of said tractor chassis.

17. A grain thresher and separator device for mounting on a tractor having a longitudinally extending central chassis, a threshing unit mounted on and across one end of said tractor and a separating unit mounted on said tractor and parallel to and adjacent one side of the longitudinally extending central chassis.

18. A device as set forth in claim 17 in which a second separating unit is mounted on said tractor and parallel to and adjacent the other side of the longitudinally extending central chassis.

19. A device as set forth in claim 17 in which a harvesting unit is hingedly mounted on the threshing unit and extends in a direction away from the tractor.

20. A device as set forth in claim 19 in which means is provided on said threshing unit for removing harvested grain from said harvesting unit and delivering it to said threshing unit.

BENJAMIN M. HYMAN.

References Cited in the file of this patent

UNITED STATES PATENTS

| Number | Name | Date |
| --- | --- | --- |
| 1,509,403 | Howard et al. | Sept. 23, 1924 |
| 1,837,906 | Herl | Dec. 22, 1931 |
| 2,109,436 | Schowengerdt | Feb. 22, 1938 |
| 2,354,346 | MacGregor | July 25, 1944 |